United States Patent
Mashitani et al.

(10) Patent No.: US 7,518,641 B2
(45) Date of Patent: Apr. 14, 2009

(54) MULTIPLE-IMAGE TRANSMISSION METHOD AND MOBILE APPARATUS HAVING MULTIPLE-IMAGE SIMULTANEOUS PHOTOGRAPHING FUNCTION

(75) Inventors: Ken Mashitani, Osaka (JP); Goro Hamagishi, Osaka (JP); Masahiro Higashino, Osaka (JP); Fusao Terada, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 503 days.

(21) Appl. No.: 10/528,655

(22) PCT Filed: Sep. 24, 2003

(86) PCT No.: PCT/JP03/12176
§ 371 (c)(1),
(2), (4) Date: Sep. 22, 2005

(87) PCT Pub. No.: WO2004/030374
PCT Pub. Date: Apr. 8, 2004

(65) Prior Publication Data
US 2006/0170785 A1    Aug. 3, 2006

(30) Foreign Application Priority Data
Sep. 27, 2002    (JP) ............................. 2002-284004

(51) Int. Cl.
*H04N 5/76* (2006.01)
(52) U.S. Cl. ................. 348/231.6; 348/218.1; 348/376; 348/47
(58) Field of Classification Search ............. 348/211.3, 348/218.1, 211.11, 42, 47, 51, 139, 376; 382/154
See application file for complete search history.

(56) References Cited

U.S. PATENT DOCUMENTS 4,573,191 A * 2/1986 Kidode et al. ............... 382/106

(Continued)

FOREIGN PATENT DOCUMENTS

JP    9-139829    5/1997

(Continued)

OTHER PUBLICATIONS

Japanese Office Action issued in corresponding Japanese Patent Application No. 2002-284004, dated Mar. 12, 2006.

(Continued)

*Primary Examiner*—Ngoc-Yen T Vu
*Assistant Examiner*—Gary C Vieaux
(74) *Attorney, Agent, or Firm*—McDermott Will & Emery LLP (57) ABSTRACT

By rotating a second camera (4) by a hinge (5) by 180 degrees so as to obtain an opening state, the second camera 4 faces a surface side. As a result, a first camera (3) and the second camera (4) are aligned horizontally, and use the same direction as a photographing range. When the second camera (4) is rotated, a system controller determines that a state is in a stereoscopic vision photographing mode. When a camera shutter is operated by a user, both the first camera (3) and the second camera (4) are allowed to perform a photographing process, and obtained two image data are stored in a memory after being attached to information indicating that the image is for the right eye and the image is for the left eye, and etc. Then, the two image data are transmitted by an e-mail function to a terminal of a communicating partner.

12 Claims, 4 Drawing Sheets

U.S. PATENT DOCUMENTS

| | | | |
|---|---|---|---|
| 5,528,518 A * | 6/1996 | Bradshaw et al. | 702/150 |
| 6,083,353 A * | 7/2000 | Alexander, Jr. | 202/158 |
| 6,324,469 B1 * | 11/2001 | Okude et al. | 701/208 |
| 6,452,544 B1 * | 9/2002 | Hakala et al. | 342/357.13 |
| 6,542,824 B1 * | 4/2003 | Berstis | 701/220 |
| 6,574,423 B1 | 6/2003 | Oshima et al. | |
| 6,839,082 B2 | 1/2005 | Lee et al. | |
| 7,039,630 B2 * | 5/2006 | Shimazu | 707/3 |
| 7,106,885 B2 * | 9/2006 | Osterweil et al. | 382/103 |
| 7,119,831 B2 * | 10/2006 | Ohto et al. | 348/135 |
| 7,170,632 B1 * | 1/2007 | Kinjo | 358/1.9 |
| 7,187,401 B2 * | 3/2007 | Alhadef et al. | 348/42 |
| 7,197,295 B2 * | 3/2007 | Otsuka et al. | 455/404.2 |
| 2006/0239537 A1 * | 10/2006 | Shragai et al. | 382/154 |

FOREIGN PATENT DOCUMENTS

| | | |
|---|---|---|
| JP | 9-289655 | 11/1997 |
| JP | 10-108152 | 4/1998 |
| JP | 11-355624 | 12/1999 |
| JP | 2001-128194 | 5/2001 |
| JP | 2001-166259 | 6/2001 |
| JP | 2001-235534 | 8/2001 |
| JP | 2001-292440 | 10/2001 |
| JP | 2002-27495 | 1/2002 |
| JP | 2002-091862 | 3/2002 |
| JP | 2002-125246 | 4/2002 |
| JP | 2002-191067 | 7/2002 |
| JP | 2003-51872 | 2/2003 |
| KR | 2002-0018331 | 3/2002 |
| WO | WO/97/32437 | 9/1997 |

OTHER PUBLICATIONS

Japanese Office Action issued in correspond Japanese Patent Application No. 2002-284004, Dated Jul. 11, 2006.

Korean Office Action issued in corresponding Korean Patent Application No. 10-2005-7005025, dated Sep. 26, 2006.

* cited by examiner

MULTIPLE-IMAGE TRANSMISSION METHOD AND MOBILE APPARATUS HAVING MULTIPLE-IMAGE SIMULTANEOUS PHOTOGRAPHING FUNCTION

TECHNICAL FIELD

The present invention relates to a multiple-image transmission method and a mobile apparatus having a multiple-image simultaneous photographing function.

BACKGROUND ART

Conventionally, as a method of realizing a stereoscopic image display without requiring special glasses, a parallax barrier system, a lenticular lens system, and so forth, are known. In such the systems, an image for a right eye and the image for a left eye which have a binocular parallax are alternately displayed on a display screen in a vertically striped shape, for example, and the displayed images, by being separated by a parallax barrier, lenticular lens, and others, are guided to each of the right eye and left eye of an observer. As a result, a stereoscopic vision is performed.

Incidentally, in recent years, due to the improvement in a communication technology and an apparatus-miniaturization technology, it has become possible to photograph an image by a mobile telephone, and transmit the photographed image to a desired terminal of a communicating partner using an e-mail function (See JP-A-2002-191067).

However, an appropriate system for obtaining, utilizing, transmitting, displaying, and so forth, a plurality of image data for the stereoscopic vision is not realized.

DISCLOSURE OF INVENTION

In view of the foregoing circumstances, it is an object of the present invention to provide a multiple-image transmission method and a mobile apparatus having a multiple-image simultaneous photographing function that are useful for a system for obtaining, utilizing, transmitting, and displaying, and so forth, a plurality of image data for the stereoscopic vision.

In order to solve the above-mentioned problem, a multiple-image transmission method of the present invention is a transmission method which transmits image data to a terminal of a communicating partner using a communication network, and comprises a transmitting-side terminal for transmitting a plurality of image data for a stereoscopic vision to the communication network, and an intermediary station of the communication network for determining whether or not the terminal of the communicating partner is stereoscopic vision-applicable, transmitting a plurality of the image data for the stereoscopic vision to a stereoscopic vision-applicable terminal, and on the other hand, transmitting one image data out of the plurality of image data to a stereoscopic vision-nonapplicable terminal.

Furthermore, a multiple-image transmission method of the present invention is a transmission method which transmits image data to a terminal of a communicating partner using a communication network, and comprises an intermediary station of the communication network for determining whether or not the terminal of the communicating partner is stereoscopic vision-applicable and conveying a result thereof to a transmitting-side terminal, and the transmitting-side terminal for transmitting, when the terminal of the communicating partner is stereoscopic vision-applicable, a plurality of image data for a stereoscopic vision to the terminal of the communicating partner, and transmitting, when the terminal of the communicating partner is stereoscopic vision-nonapplicable, one image data out of the plurality of image data.

Such the methods are capable of preventing disadvantages that a plurality of image data for the stereoscopic vision are transmitted to the stereoscopic vision-nonapplicable terminal, and the capacity of the memory in the terminal is occupied by unnecessary image data.

In addition, a mobile apparatus having a multiple-image simultaneous photographing function of the present invention is characterized by comprising a stereoscopic camera means for obtaining a plurality of image data for a stereoscopic vision by executing a simultaneous photographing, and a communication means for transmitting the plurality of image data for the stereoscopic vision to a communication network.

With the above-mentioned configuration, a plurality of image data for the stereoscopic vision can be transmitted using e-mail, and so forth, by as simple an operation as conventional one including photographing single image and transmitting an e-mail.

Furthermore, a mobile apparatus having a multiple-image simultaneous photographing function of the present invention is characterized by comprising a stereoscopic camera means for obtaining a plurality of image data for a stereoscopic vision by executing a simultaneous photographing, a means for measuring a distance between the mobile apparatus and an object to be imaged on the basis of the plurality of image data for stereoscopic vision, and a means for generating information based on a measured distance so as to present the information to a user.

With the above-mentioned configuration, for example, a distance between the user and a telegraph pole in front can be measured by a plurality of image data for the stereoscopic vision obtained by photographing an image in front of the user. Obtaining information about the distance leads to enhancement of walking safety for people who have weak sight.

Furthermore, a mobile apparatus having a multiple-image simultaneous photographing function of the present invention is characterized by comprising a stereoscopic camera means for obtaining a plurality of image data for the stereoscopic vision by executing a simultaneous photographing, a means for generating three-dimensional data on the basis of the plurality of image data for the stereoscopic vision, a means for carrying out an approximate measuring of location information, a means for obtaining detailed location information on the basis of a correspondence between three-dimensional map data of a present location obtained by the approximate measuring, and three-dimensional data formed of the plurality of image data for the stereoscopic vision, and presenting the information to a user.

With the above-mentioned configuration, the user can know his or her location precisely by obtaining detailed location information based on the correspondence between three-dimensional map data of the present location obtained by the approximate measuring and three-dimensional data based on a plurality of the image data for the stereoscopic vision.

Approximate measurement of location information may be performed by a GPS. Also, three-dimensional data based on a plurality of image data for the stereoscopic vision may be transmitted to a data processing center via a communication network, and the detailed location information calculated by the data processing center may be obtained by a communication.

In addition, in such the mobile apparatuses having the multiple-image simultaneous photographing function, the stereoscopic camera means may be so configured, as a result of being provided with two cameras, to execute simultaneous photographing so as to obtain a plurality of image data for the stereoscopic vision. Alternatively, the stereoscopic camera means may be configured to be provided with one camera, and a terminal with which the other camera is detachably provided, and to carry out the simultaneous photographing using the both cameras so as to obtain a plurality of image data for the stereoscopic vision.

Furthermore, the stereoscopic camera means may be configured to be provided with one camera, in addition, a means for remotely operating another camera apparatus, and a means for receiving photographed image data, and to execute the simultaneous photographing using the camera and the camera apparatus so as to obtain a plurality of image data for the stereoscopic vision. In such the configuration, it may be configured to be provided with a means for displaying two images, and to display an image photographed by the camera of the mobile apparatus on one image display side, and display an image received from another camera apparatus on the other image display side. Also, a stereoscopic image display means for allowing stereoscopic vision to be carried out by a plurality of image data for the stereoscopic vision may be provided and stereoscopic vision display for confirmation is carried out using an image being photographed by the camera of the mobile apparatus, and an image being received from another camera apparatus.

In the configuration in which two cameras are provided, at least one of the two cameras may be rendered capable of moving a location, and an interval between the two cameras may be rendered variable. Alternatively, one of the two cameras may be provided on a surface side of the apparatus, while the other camera may be provided on a rear side of the apparatus, and one of the two cameras, as a result of being rotated by a hinge, faces the surface side or the reverse side. Also, a rotation angle of the camera may be settable.

Furthermore, in such the mobile apparatuses having the multiple-image simultaneous photographing function, the stereoscopic image display means for allowing a stereoscopic vision on the basis of a plurality of image data for the stereoscopic vision may be provided.

BRIEF DESCRIPTION OF DRAWINGS

FIG. 1(a) shows a closing state of a second camera;

FIG. 1(b) shows an opening state of a second camera;

BEST MODE FOR CARRYING OUT THE INVENTION

Hereinafter, a mobile apparatus having a multiple-image simultaneous photographing function and a multiple-image transmission method according to an embodiment of the present invention will be described referring to FIGS. 1 to 5.

Figure 1:
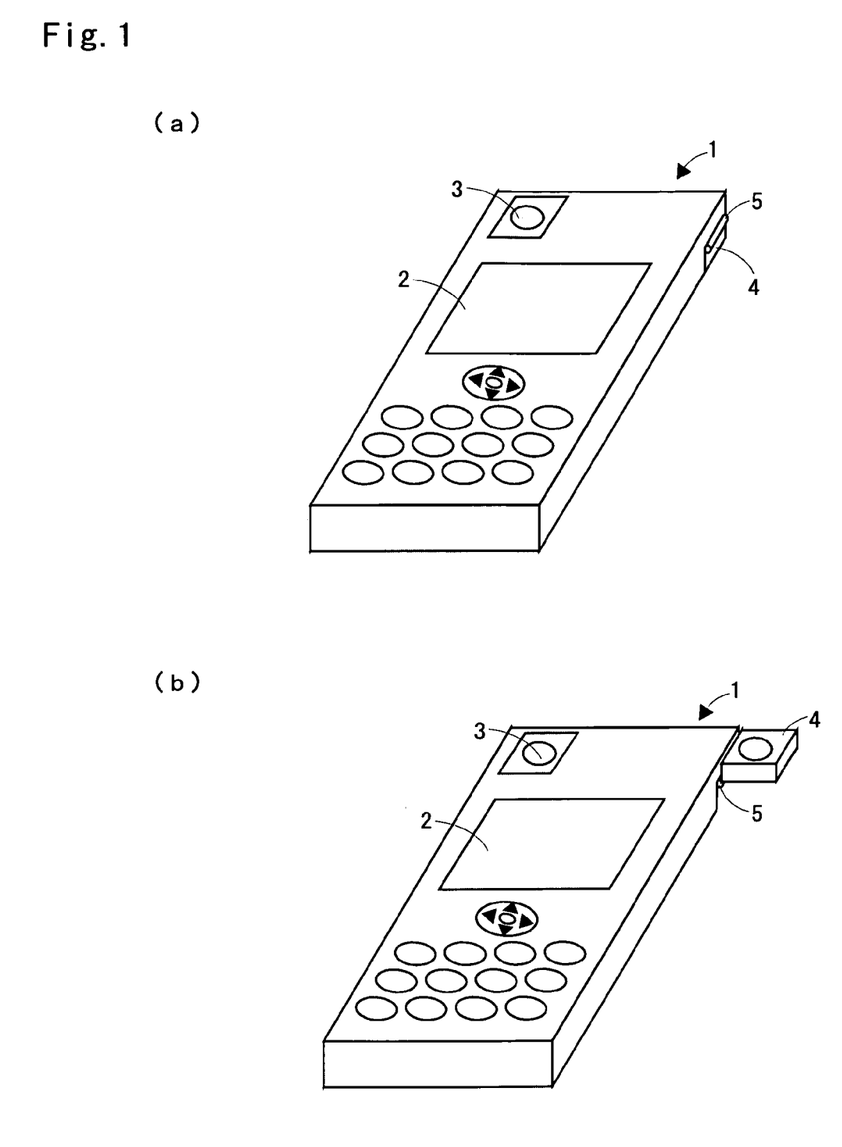
FIG. 1 is a perspective view of a mobile telephone with camera (mobile apparatus having a multiple-image simultaneous photographing function) according to an embodiment of the present invention.

FIG. 1 illustrates a mobile telephone with camera 1 as a mobile apparatus having a multiple-image simultaneous photographing function. A first camera 3 is provided on an upper left position of a surface side on which a display screen 2 of the mobile telephone with camera 1 is provided. Furthermore, a second camera 4 is provided on an upper left position (upper right position seen from the surface side) of a rear side of the mobile telephone with camera 1. The second camera 4 is provided rotatably by a hinge 5. By rotating the second camera 4 by the hinge 5 by 180 degrees so as to obtain an opening state, the second camera 4 faces the surface side, and as a result, the first camera 3 and the second camera 4 are aligned horizontally, and use the same direction as a photographing range. It is noted that in an example shown in FIG. 1, the second camera 4 is rotatable by the hinge 5. However, by rendering the first camera 3 rotatable, it becomes possible to turn a photographing direction of both the first camera 3 and the second camera 4 to the rear side. A rotating manner is not limited to the above-mentioned example. Furthermore, in an ordinary single image photographing for a plane vision, it is possible, by an operation by a user, to arbitrarily select either the first camera 3 or the second camera 4.

If the second camera 4 is rotated, a switch not shown is turned on, and this on-information is applied to a system controller of the mobile telephone. In this state, the system controller determines that the state is in a stereoscopic vision photographing mode. When a camera shutter is operated by the user, both the first camera 3 and the second camera 4 are allowed to perform a photographing process, and obtained two image data are stored in a memory. When the data are stored in the memory, information indicating that the image is for the right eye or the image is for the left eye is respectively attached to the two image data.

The mobile telephone with camera 1 is provided with an e-mail transmission function, and by using the e-mail transmission function, reads out the image data from the memory so as to transmit the data to a desired terminal of a communicating partner. A system regarding transmitting the two image data obtained by the stereoscopic vision photographing mode will be described in detail later.

It is noted that when the second camera 4 is rotated by the hinge 5 by less than 180 degrees so as to obtain the opening state, photographing ranges of the first camera 3 and the second camera 4 are rendered different. That is, a photographing range, as a whole, becomes wide in a horizontal direction. By determining an overlapped area of the photographing range of the first camera 3 and the photographing range of the second camera 4 by a corresponding point matching process, and carrying out a process for splicing the two photographed image data, it becomes possible to obtain an oblong image, that is, a so-called panorama image.

Furthermore, the mobile telephone with camera 1 is provided with such a function as to carry out a distance measuring to a photographed object using the two image data obtained in the stereoscopic vision photographing mode. The points where lines connecting the object to be photographed with the center of lenses of two cameras intersect a camera CCD change in position on CCDs of the two cameras with respect to the distance to the photographed object. Accordingly, a distance from the camera to the object to be photographed changes, and a position of the points on the CCDs also changes. The points on the CCDs of the two cameras are determined by carrying out the corresponding point matching process, and it becomes possible to measure the distance to the object to be photographed on the basis of a relation between the corresponding points and the distance between the CCDs. The mobile telephone with camera 1 displays the measured distance on the display screen 2, outputs a sound or voices by an audio synthesis. In addition to conveying a numerical value at the distance to the user, when, for example, it is detected that the distance to the object to be photographed is 1 meter or so, the mobile telephone with camera 1 may output a sound such as "Be careful. Obstruction ahead", or a warning sound. This enhances a walking safety for people with weak sight. In addition, it is possible to convey the sound or voices by using a bone-conducting earphone for people with weak ears.

In addition, the mobile telephone with camera 1 mounts a GPS (Global Positioning System), and is capable of performing an appropriate measuring of a present location of the telephone. Conventionally, there have been considered a mobile phone mounted with the GPS, and moreover, a system in which a data processing center determines a location of the mobile telephone based on intra-base station information, and etc., obtained by a location registering process of the mobile telephone, and applies to the mobile telephone map information corresponding to the location of the mobile telephone. However, an accuracy of the location information measured by the GPS is 3 meters or so. This is too approximate as the location information. The mobile telephone with camera 1 transmits to the data processing center the two image data obtained by two cameras 3 and 4, and the GPS location information, when a present location determining mode is selected and the shutter is operated by the user. In the data processing center, three-dimensional map data (information of a shape of buildings, etc., too, is included) is obtained from a three-dimensional map database on the basis of the GPS location information (moreover, location registration information). Furthermore, the data processing center produces three-dimensional image information based on the two image data sent from the mobile telephone with camera 1, and correctly determines the photographing location by comparing the three-dimensional image information and the three-dimensional map data so as to apply the correct location information to the mobile telephone with camera 1. The mobile telephone with camera 1 is capable of correctly attaching a mark indicating the present location on a plane map displayed on the display screen 2 on the basis of the correct location information.

It is noted that the mobile telephone with camera 1 may mount a small high-capacity memory, in which the three-dimensional map data is stored, and furthermore may mount a function for producing, based on the two image data, the three-dimensional image information, and a function for comparing the three-dimensional image information and the three-dimensional map data. With this configuration, it is possible to produce the correct location information without depending on the data processing center.

Figure 2:
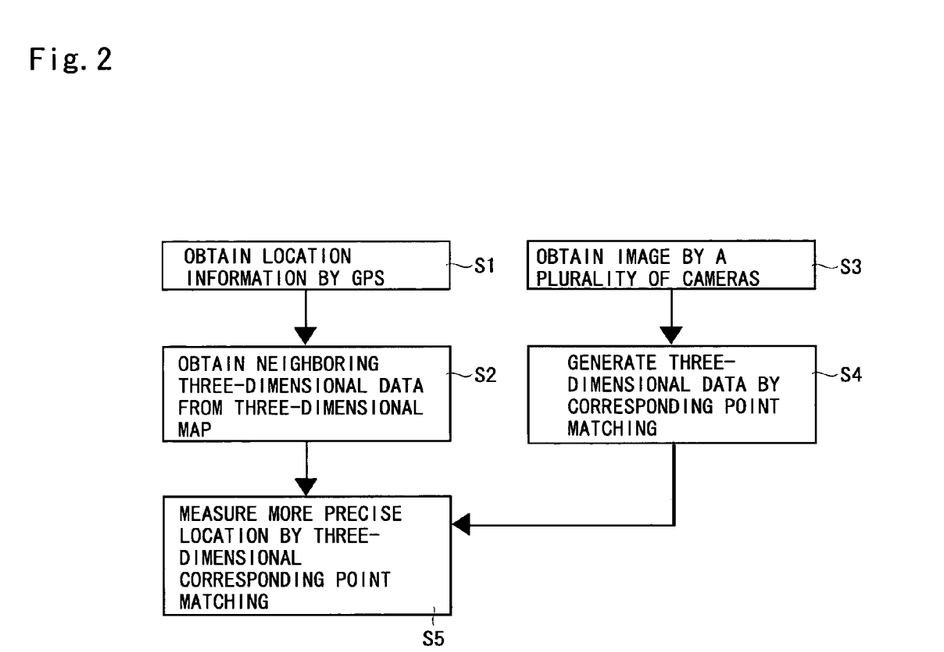
FIG. 2 is a flow chart showing a process content of generating high-precision location information.

A flow chart showing an obtaining process of the correct location information based on the three-dimensional image information and the three-dimensional map data is simply illustrated in FIG. 2 (steps S1~S5). Obtaining such the correct location information enables to apply the sound information such as "You are approaching such-and-such an intersection. Be careful.", for example to the person with weak sight. Furthermore, by applying situation information informing that there is a construction or work under progress in various locations in the three-dimensional map data, and transmitting the information to the mobile telephone with camera 1, for example, so that it is possible to apply the sound information such as "You are approaching a construction site. Be careful" to the mobile telephone with camera 1.

Figure 3:
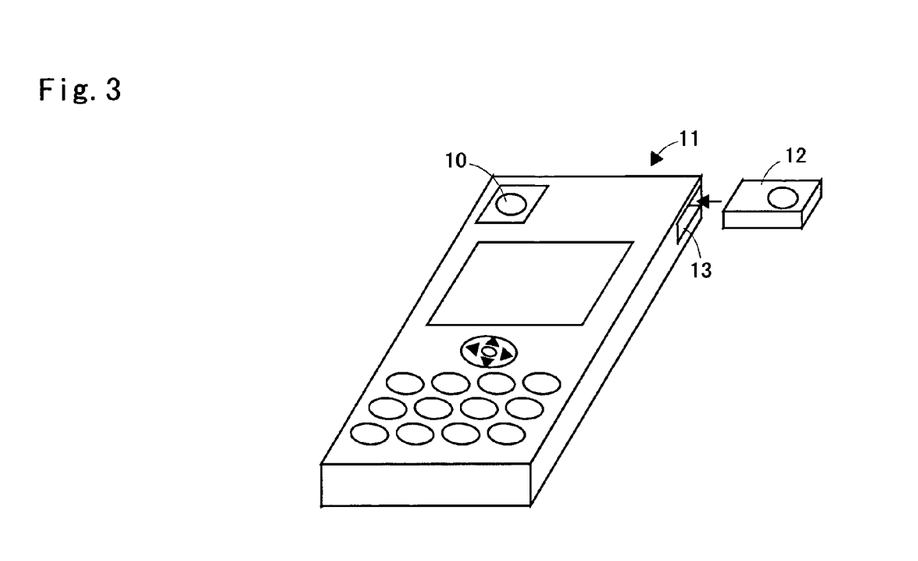
FIG. 3 is a perspective view showing another example of a mobile telephone with camera according to an embodiment of the present invention.

In FIG. 3, a mobile telephone 11 provided with one camera 10 is shown. The mobile telephone with camera 11 is provided with a terminal 13 (a USB terminal, for example) in which the other one camera 12 is removably mounted. When the camera 12 is attached to the terminal 13, the camera 10 and the camera 12 are aligned horizontally, and use the same direction as a photographing range. In an example shown in FIG. 3, a photographing direction of the camera 10 and the camera 12 faces a surface side, and however, a photographing direction of the cameras 10 and 12 may face a rear side. When the camera 12 is attached to the terminal 13, a system controller detects that the camera 12 is attached. In this state, the system controller determines that the state is in the stereoscopic vision photographing mode, and when a camera shutter is operated by a user, both of the camera 10 and the camera 12 are allowed to perform a photographing process, and the obtained two image data are stored in a memory. When the image data are stored in the memory, information indicating that the image is for the right eye is added to the image of the camera 10, on the other hand, information indicating that the image is for the left eye is added to the image of the camera 12.

Figure 4:
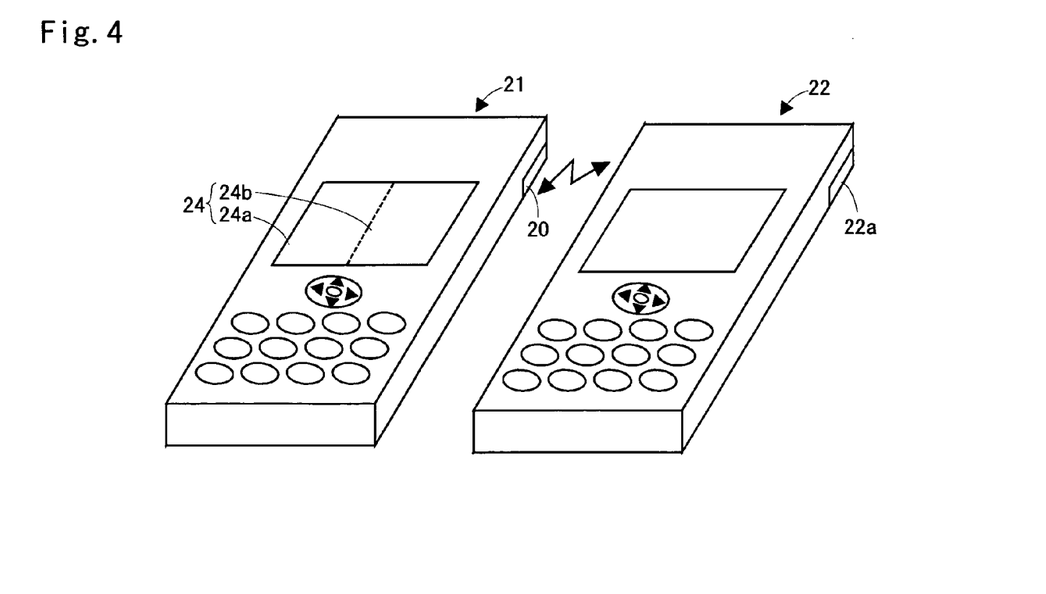
FIG. 4 is a perspective view showing another example of a mobile telephone with camera according to an embodiment of the present invention.
Figure 5:
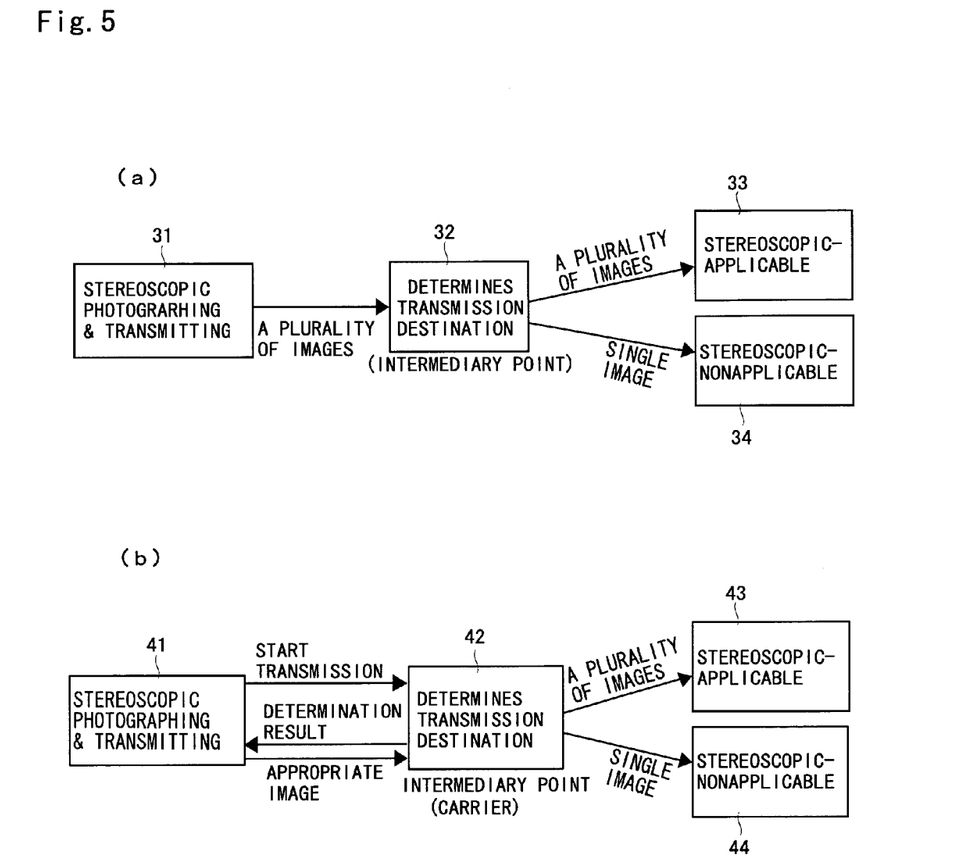
FIG. 5(a) and FIG. 5(b) are descriptive diagrams respectively showing a multiple-image transmission system of the present invention.

In FIG. 4, a mobile telephone with camera 21 provided with one camera 20, and another camera apparatus 22 are illustrated. The mobile telephone with camera 21 is provided with a function for remotely operating another camera apparatus 22, a function for receiving photographed image data from another camera apparatus 22, and a display-dividable screen 24 that displays each of the two images. In case of a remote operation or an image data reception, in addition to a wired communication that uses a USB interface, a wireless communication (radio wave, infrared light) may be used, for example. The mobile telephone with camera 21, in the stereoscopic photographing mode, displays an image which is being photographed by the camera 20 in a divided area 24a of the display screen 24, and receives an image which is being photographed by the camera 22a of the camera apparatus 22 so as to be displayed in a divided area 24b of the displays screen 24. The user is capable of adjusting a direction of the cameras, and so forth, by looking at the displayed image on the display screen 24. When the user depresses a shutter button of the mobile telephone with camera 21 after adjusting the direction of the camera, a photographing process is executed in the camera 20 of the mobile telephone, and at the same time, a remote shutter instruction is issued to another camera apparatus 22. Then, the mobile telephone with camera 21 stores in the memory the photographed image by the camera 20, and the photographed image to be transmitted by the camera apparatus 22. At the time of storing into the memory, information indicating that the image is for the left eye is to be added to the image obtained by the camera 20, and information indicating that image is for the right eye is to be added to the image of the camera 22a. With such the configuration, it becomes possible to freely change intervals between the two cameras.

In the mobile telephone with camera 21 shown in FIG. 4, one display screen is to be divided into two areas. However, the mobile telephone may be provided with two display screens. Moreover, the mobile telephone may be provided with one display screen, and provided with a stereoscopic display function that allows a stereoscopic vision to be performed by using the two image data. As a display means in such a case, a liquid crystal display panel is used, for example. On the liquid crystal display panel, two images (the image for the right eye, and the image for the left eye) are displayed alternately in a vertically striped shape, for example. In a case of a normal plane vision, only one image may be displayed. On the liquid crystal display panel, a partial retardation plate (a plate referred to as micro pole, for example, may be used) is attached. The partial retardation plate is formed in such a manner as to have retardation portions which change an oscillation direction of an incident light by 90 degrees and emit lights, and non-retardation portions alternately in a vertically striped shape. The retardation portions correspond to the images for the right eye and the images for the left eye to be displayed in the vertically striped shape, and are formed in locations in which light-shielding portions or translucent portions required for the stereoscopic vision are to be formed. In addition, a polarizing plate is freely or non-freely to be arranged.

The stereoscopic image display function is provided so that it becomes possible to perform a confirmation of a stereoscopic vision at a stage of photographing, to easily adjust the photographing direction, and etc., in the two cameras. It is noted that the camera apparatus 22 may be provided with two display screens and/or the stereoscopic image display function. In addition, the previously illustrated mobile telephones with camera shown in FIG. 1 and FIG. 3 may be provided with the stereoscopic image display function. Needless to say, the mobile telephones with camera shown in FIG. 3 and FIG. 4 may be provided with, not to mention an e-mail function, a location measuring function and a highly precise location information generation function.

In a configuration in which the stereoscopic image display function is provided, it is desirable to be provided with a head tracking mechanism. As the head tracking mechanism, a mechanism shown in a stereoscopic visioning system without glasses (JP-A-2001-166259) shown in the previous application by the applicant of the present invention may be used.

Next, a system for transmitting the two image data will be described. It is noted that the two images may, in addition to the image photographed in the stereoscopic vision photographing mode, be two images composed of an ordinary plane image, and an image obtained by a depth-map (distance information generation) process.

In a system shown in FIG. 5(a), a transmitting-side terminal 31 transmits a plurality of image data for the stereoscopic vision to the communication network. An intermediary station 32 of the communication network determines whether or not a terminal of a communicating partner (33 or 34) is stereoscopic vision-applicable type. For the determination, it may be provided with a database in which information about a type of the terminal (stereoscopic vision-applicable or stereoscopic vision-nonapplicable) is corresponded to an e-mail address of the terminal. Or, it may be possible to obtain information of whether applicable or nonapplicable from the terminal of the communicating partner (33, 34) by establishing a communication with the communicating partner. The intermediary station 32 of the communication network transmits a plurality of image data for the stereoscopic vision to the stereoscopic vision-applicable terminal 33. On the other hand, the intermediary station 32 transmits one image data out of a plurality of the image data to the stereoscopic vision-nonapplicable terminal 34. As a method of selecting one image, for example, considered are a method for selecting the image for the right eye out of the two transmitted images using information indicating that the image is for the right eye and the image is for the left eye that are attached to the two transmitted images, and a method for selecting the image transmitted first out of the two transmitted images, etc.

In a system shown in FIG. 5(b), a transmitting-side terminal 41 conveys a message informing of transmitting to an intermediary station 42 of the communication network a plurality of image data for the stereoscopic vision to terminals of a communicating partner (43,44). The intermediary station 42 of the communication network determines whether the terminals of the communicating partner (43, 44) are stereoscopic vision-applicable types or, non-applicable types, and conveys the result to the transmitting-side terminal. The transmitting-side terminal 41 transmits a plurality of image data for the stereoscopic vision to the terminal of the communicating partner, when the terminal is the stereoscopic-vision applicable terminal 43. On the other hand, the terminal 41 transmits one image data out of a plurality of the image data to the terminal of the communicating partner, when the terminal is the stereoscopic vision-nonapplicable terminal 44. As a method of selecting one image, for example, considered is a method for selecting the image for the right eye out of the two transmitted images using information indicating that the image is for the right eye and the image is for the left eye that are attached to the two transmitted images, etc.

By such the system, it becomes possible to prevent a disadvantage that a plurality of image data for the stereoscopic vision are transmitted to the stereoscopic vision-nonapplicable types (33, 44), and a memory is consumed by unnecessary image data in the type. As a result, for the transmitting-side, it becomes possible to transmit the image data without regard to the type of the communicating partners.

It is noted that a mobile apparatus with camera having a distance measuring function may be equipped in a car and a warning may be issued to a driver when an obstruction is detected ahead of the car. In addition, in a case that the obstruction ahead of the car is an oncoming car, and it is possible to communicate between the mobile apparatus and an apparatus placed in the oncoming car, warning information may be issued to the apparatus. The above-described example shows the apparatus having a two-screen display, however the apparatus may have more screen display. Also the above-described example shows the apparatus provided with the two display screens, however the apparatus may have more display screens. Moreover, the above-described example shows the apparatus having two cameras, however the apparatus may have more cameras. If the apparatus has equal to or more than three cameras, a multiple-eye stereoscopic display is made possible. In addition, if the apparatus has a plurality of cameras, it is possible, too, to simultaneously photograph the images of completely different directions to each other, and the images in the same direction but having a different zoom.

As described above, the present invention is effective in that the invention is useful in a system for obtaining, utilizing, transmitting, displaying, and so forth, a plurality of image data for the stereoscopic vision.

The invention claimed is:

1. A mobile apparatus having a multiple-image simultaneous photographing function, comprising:
   a stereoscopic camera means for obtaining a plurality of image data for the stereoscopic vision by executing a simultaneous photographing;
   a means for generating three-dimensional data on the basis of said plurality of image data for the stereoscopic vision;
   a means for carrying out an approximate measuring of location information; and a means for obtaining detailed location information on the basis of a correspondence between three-dimensional map data of a present location obtained by said approximate measuring, and three-dimensional data formed of said plurality of image data for the stereoscopic vision, and presenting the information to a user.

2. A mobile apparatus having a multiple-image simultaneous photographing function according to claim 1, wherein the approximate measuring of said location information is performed by a GPS.

3. A mobile apparatus having a multiple-image simultaneous photographing function according to claim 1, wherein the three-dimensional data based on said plurality of image data for the stereoscopic vision is transmitted to a remote data processing center via a wireless radio communication network, and the detailed location information calculated by the data processing center is obtained by a communication.

4. A mobile apparatus having the multiple-image simultaneous photographing function according to any one of claims 1, 2, or 3, wherein said stereoscopic camera means is provided with one camera, and a terminal with which the other camera is detachably provided, and carries out the simultaneous photographing using the both cameras so as to obtain a plurality of image data for the stereoscopic vision.

5. A mobile apparatus having the multiple-image simultaneous photographing function according to any one of claims 1, 2, or 3, wherein said stereoscopic camera means is provided with one camera, in addition, a means for remotely operating another camera apparatus, and a means for receiving photographed image data, and executes the simultaneous photographing using said camera and said camera apparatus so as to obtain a plurality of image data for the stereoscopic vision.

6. A mobile apparatus having a multiple-image simultaneous photographing function according to claim 5, comprising a means for displaying two images, wherein image photographed by the camera of said mobile apparatus is displayed on one image display side, and an image received from another camera apparatus is displayed on the other image display side.

7. A mobile apparatus having a multiple-image simultaneous photographing function according to claim 5, comprising a stereoscopic image display means for allowing stereoscopic vision to be carried out by a plurality of image data for the stereoscopic vision, wherein stereoscopic vision display for confirmation is carried out using an image being photographed by the camera of said mobile apparatus, and an image being received from another camera apparatus.

8. A mobile apparatus having the multiple-image simultaneous photographing function according to any one of claims 2 or 3, wherein said stereoscopic camera means, as a result of being provided with two cameras, executes a simultaneous photographing so as to obtain a plurality of image data for the stereoscopic vision.

9. A mobile apparatus having a multiple-image simultaneous photographing function according to claim 8, wherein at least one of the two cameras is rendered capable of moving a location, and an interval between the two cameras is rendered variable.

10. A mobile apparatus having the multiple-image simultaneous photographing function according to claim 8, provided with two cameras, one of which is on a surface side of the apparatus, and the other of which is on a rear side of the apparatus, and any one of the cameras rotated by a hinge so as to be faced to the surface side or the rear side.

11. A mobile apparatus having a multiple-image simultaneous photographing function according to claim 10, wherein a rotation angle of the camera is settable.

12. A mobile apparatus having a multiple-image simultaneous photographing function according to any one of claims 2 or 3, comprising a stereoscopic image display means for allowing a stereoscopic vision on the basis of a plurality of image data for the stereoscopic vision.

* * * * *